United States Patent [19]

Newkirk

[11] Patent Number: 4,859,640
[45] Date of Patent: Aug. 22, 1989

[54] METHOD OF MAKING CERAMIC COMPOSITE ARTICLES WITH SHAPE REPLICATED SURFACES

[75] Inventor: Marc S. Newkirk, Newark, Del.

[73] Assignee: Lanxide Technology Company, LP, Newark, Del.

[21] Appl. No.: 896,157

[22] Filed: Aug. 13, 1986

[51] Int. Cl.$^4$ .............................................. C04B 35/10
[52] U.S. Cl. ...................................... 501/128; 501/87; 501/96; 501/103; 501/119; 501/127; 264/65
[58] Field of Search .............. 264/65; 75/235; 501/88, 501/92, 98, 96, 94, 119, 127, 128, 103

[56] References Cited

U.S. PATENT DOCUMENTS

| 1,362,237 | 12/1920 | Ros | 423/618 OR |
|---|---|---|---|
| 2,741,822 | 4/1956 | Udy | 264/65 OR |
| 3,108,887 | 10/1963 | Lenie | 501/98 X |
| 3,255,027 | 6/1966 | Talsma | 264/65 |
| 3,262,763 | 7/1966 | Bechtold | 501/98 X |
| 3,296,002 | 1/1967 | Hare | 501/80 OR |
| 3,298,842 | 1/1967 | Suefert | 501/127 |
| 3,419,404 | 12/1968 | Mao | 501/98 X |
| 3,421,863 | 1/1969 | Bawa | 501/128 |
| 3,437,468 | 4/1967 | Suefert | 75/235 |
| 3,473,938 | 10/1969 | Oberlin | 264/65 |
| 3,473,987 | 10/1969 | Sowards | 501/119 |
| 3,514,271 | 5/1970 | Yates | 501/96 X |
| 3,538,231 | 11/1970 | Newkirk et al. | 373/117 |
| 3,551,101 | 12/1970 | Matsuo | 423/412 OR |
| 3,649,310 | 3/1972 | Yates | 501/92 X |
| 3,669,695 | 6/1972 | Iler | 501/96 X |
| 3,692,474 | 9/1972 | Arber | 423/411 X |
| 3,789,096 | 1/1974 | Church | 264/60 OR |
| 3,864,154 | 2/1975 | Gazza et al. | 264/60 X |
| 3,973,977 | 8/1976 | Wilson | 501/120 |
| 4,117,096 | 9/1978 | Hosaka et al. | 501/88 X |
| 4,249,914 | 2/1981 | Ogawa et al. | 501/127 X |
| 4,325,710 | 4/1982 | Tanaka et al. | 501/127 X |
| 4,354,991 | 10/1982 | Suzuki et al. | 501/89 X |
| 4,478,785 | 10/1984 | Huseby et al. | 501/96 X |
| 4,591,537 | 5/1986 | Aldinger et al. | 501/96 X |

FOREIGN PATENT DOCUMENTS

| 0155831 | 9/1985 | European Pat. Off. . | |
|---|---|---|---|
| 0169067 | 1/1986 | European Pat. Off. . | |
| 0127208 | 7/1985 | Japan | 423/412 |
| 1011527 | 4/1983 | U.S.S.R. | 423/618 |
| 0896766 | 5/1962 | United Kingdom | 423/412 |
| 2127709 | 4/1984 | United Kingdom | 423/412 |

OTHER PUBLICATIONS

Drouzy et al, "Oxidation of Molten Aluminum Alloys", Reaction with Refractories, France, vol. 29, No. 332, pp. 121–128, Mar. 1974.
Clarand et al, "Refractories for Aluminum Alloy Melting Furnaces", Sep. 25 & 26, 1980.
Moskovits, "The Kinetics of Oxidation of Molten Aluminum in Oxidation Systems", Oxidation of Metals, Vol. 5, No. 1, (1972).

Primary Examiner—William R. Dixon, Jr.
Assistant Examiner—Karl Group
Attorney, Agent, or Firm—Mark G. Mortenson; Michael K. Boyer

[57] ABSTRACT

A method for producing a self-supporting ceramic composite body having a negative pattern which inversely replicates the positive pattern of a parent metal precursor having thereon a positive pattern section which is emplaced in conforming engagement with a bed of conformable filler. The parent metal precursor, which also has a non-replicating section, is melted and reacted with an oxidant to form a polycrystalline oxidation reaction product which grows primarily only from the positive pattern section of the parent metal precursor and through the filler. The molten parent metal is drawn through the growing polycrystalline material and oxidized at the interface between the oxidant and previously formed oxidation reaction product. The reaction is continued for sufficient time to at least partially embed the filler within the oxidation reaction product and form the ceramic composite body containing a negative pattern which inversely replicates the positive pattern of the parent metal precursor.

27 Claims, 4 Drawing Sheets

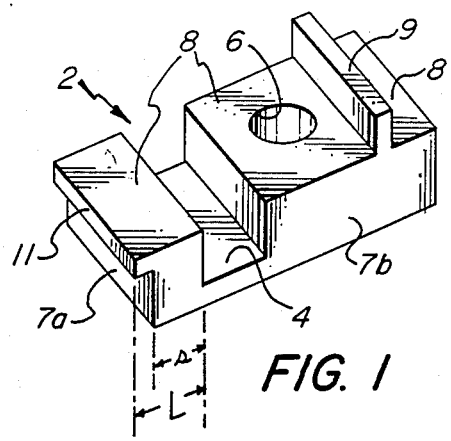
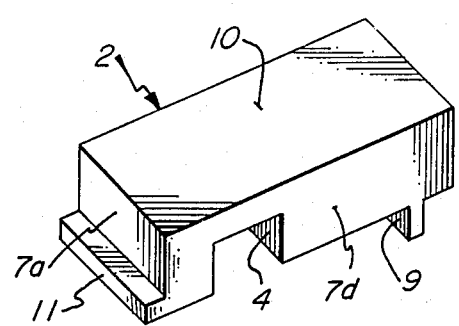
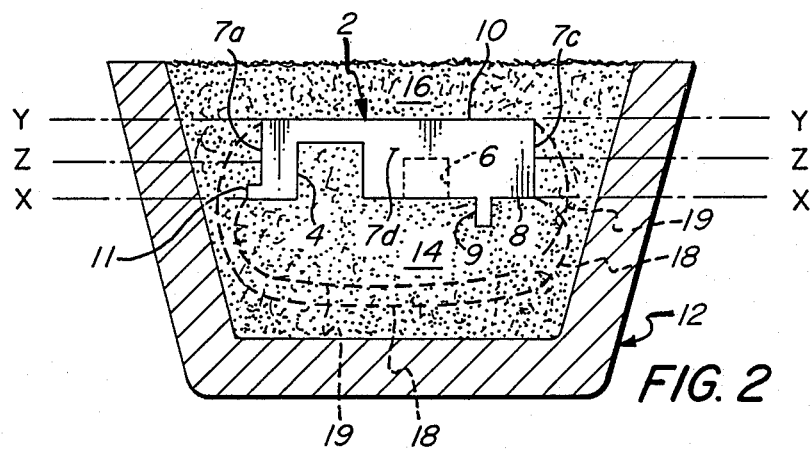

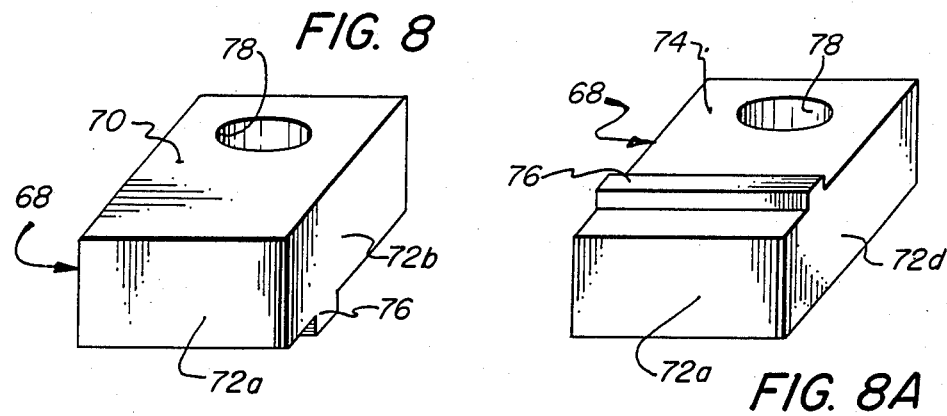
FIG. 8
FIG. 8A
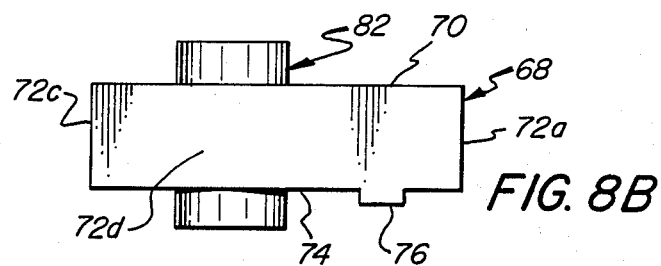
FIG. 8B
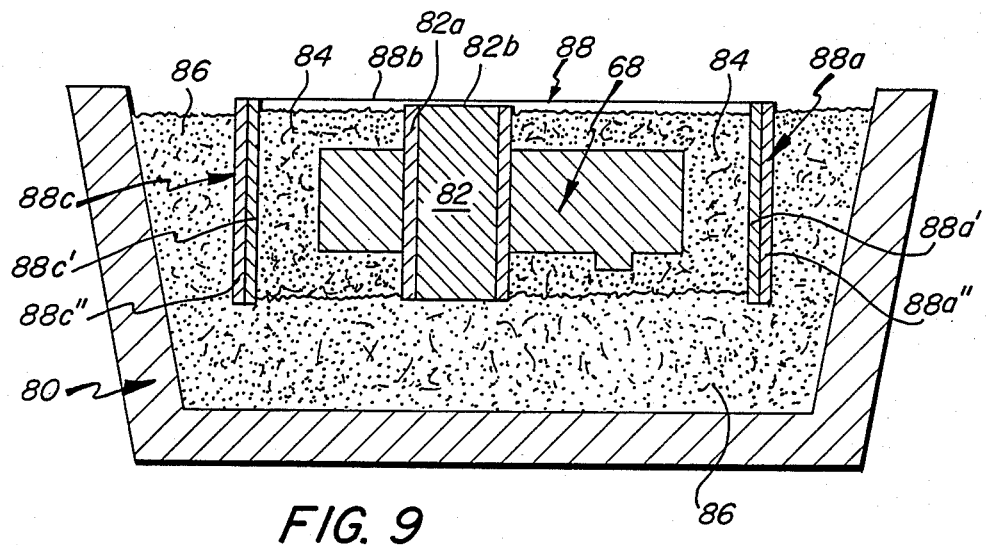
FIG. 9

METHOD OF MAKING CERAMIC COMPOSITE ARTICLES WITH SHAPE REPLICATED SURFACES

BACKGROUND OF THE INVENTION

1. Field of the Invention

The present invention broadly relates to ceramic composite bodies having a shape replicated portion thereof and to methods of making the same In particular, the invention relates to ceramic composite bodies comprising a polycrystalline matrix embedding a filler and having a negative pattern shaped by inverse replication of a positive pattern of a parent metal precursor, and to methods of making the composites by infiltrating a bed of filler with the oxidation reaction product of the parent metal precursor, the positive pattern of which is inversely replicated to form the negative pattern of the ceramic composite.

2. Description of Commonly Owned Patent Applications

The subject matter of this application is related to that of copending and Commonly Owned U.S. patent applications Ser. No. 819,397, filed Jan. 17, 1986, which is a continuation-in-part of Ser. No. 697,878, filed Feb. 4, 1985, both in the name of Marc S. Newkirk et al and entitled "Composite Ceramic Articles and Methods of Making Same." These copending applications disclose a novel method for producing a self-supporting ceramic composite by growing an oxidation reaction product from a parent metal into a permeable mass of filler. The resulting composite, however, has no defined or predetermined configuration.

The method of growing a ceramic product by an oxidation reaction is disclosed generically in copending Commonly Owned U.S. patent applications Ser. No. 818,943, filed Jan. 15, 1986 as a continuation-in-part of Ser. No. 776,964, filed Sept. 17, 1985, which is a continuation-in-part of Ser. No. 705,787, filed Feb. 26, 1985, which is a continuation-in-part of Ser. No. 591,392, filed Mar. 16, 1984, all in the name of Marc S. Newkirk et al and entitled "Novel Ceramic Materials and Methods of Making The Same." The employment of an unusual oxidation phenomenon as described in the aforesaid Commonly Owned patent applications, which may be enhanced by the use of an alloyed dopant, affords self-supporting ceramic bodies grown as the oxidation reaction product from a precursor parent metal and a method of making the same. The method was improved upon by the use of external dopants applied to the surface of the precursor parent metal as disclosed in Commonly Owned U.S. applications Ser. No. 822,999, filed Jan. 27, 1986, which is a continuation-in-part of Ser. No. 776,965, filed Sept. 17, 1985, which is a continuation-in-part of Ser. No. 747,788, filed June 25, 1985, which is a continuation-in-part of Ser. No. 632,636, filed July 20, 1984, all in the name of Marc S. Newkirk et al and entitled "Methods of Making Self-Supporting Ceramic Materials".

A method of forming ceramic bodies having one or more shaped cavities therein is disclosed in copending and Commonly Owned U.S. patent application Ser. No. 823,542, filed Jan. 27, 1986 in the name of Marc S. Newkirk et al and entitled "Inverse Shape Replication Method of Making Ceramic Composite Articles and Articles Obtained Thereby" The cavity formed in the ceramic body inversely replicates the shape of a positive pattern or mold of the parent metal which is embedded within and entirely surrounded by a conformable filler which is sufficiently conformable to accommodate differential thermal expansion between the filler and the parent metal plus the melting point volume change of the metal, and which self-bonds at an appropriate temperature to insure that the cavity formed by migration of molten parent metal into the filler (to form oxidation reaction product) does not collapse due to the pressure differential created across the developing cavity wall as a result of the cavity-forming migration.

The entire disclosure of each of the foregoing Commonly Owned Patent Applications is expressly incorporated herein by reference.

BACKGROUND AND PRIOR ART

In recent years, there has been increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which encloses one or more diverse kinds of filler materials such as particulates, fibers, rods or the like.

The traditional methods of preparing ceramic articles involve the following general steps: (1) preparation of ceramic material in powder form; (2) grinding or milling of powders to obtain very fine particles; (3) formation of the powders into a body having the desired shape (with allowance for shrinkage during subsequent processing), for example, by uniaxial pressing, isostatic pressing, injection molding, tape casting, slip casting or any of several other techniques; (4) densification of the body by heating it to an elevated temperature such that the individual powder particles merge together to form a coherent structure; preferably, accomplished without the application of pressure (i.e., by pressureless sintering), although in some cases an additional driving force is required and can be provided through the application of external pressure either uniaxially (i.e., hot pressing) or isostatically, i.e., hot isostatic pressing; and (5) finishing, frequently by diamond grinding, as required.

A considerable amount of current work is directed toward improved powder processing technologies. The emphasis in such developments has been in two areas: (1) improved methods of producing ultrafine, uniform powder materials using sol-gel, plasma and laser techniques, and (2) improved methods of densification and compaction, including superior techniques for sintering, hot pressing and hot isostatic pressing. The object of these efforts is to produce dense, fine-grained, flaw-free microstructures, and, in fact, improvements in performance capabilities in ceramics have been attained in some areas. However, these developments tend to result in dramatic increases in the cost of producing ceramic structures. Thus, cost becomes a major restriction on the commercial application of ceramics.

Another limitation in ceramic engineering which is aggravated by modern ceramic processing is scaling versatility. Conventional processes aimed at densification (i.e., removal of voids between powder particles) are incompatible with large one-piece structural application possibilities for ceramics. An increase in article size presents several problems including, for example, increased process residence times, stringent requirements for uniform process conditions over a large process volume, cracking of parts due to non-uniform densification or thermally induced stresses, warping and sagging of parts during sintering, excessive compaction forces and die dimensions if hot pressing is used, and excessive pressure vessel costs due to internal volume and wall thickness requirements in the case of hot isostatic pressing.

When these traditional methods are applied to the preparation of ceramic matrix composite materials, additional difficulties arise. Perhaps the most serious problems concern the densification step, number (4) above. The normally preferred method, pressureless sintering, can be difficult or impossible with particulate composites if the materials are not highly compatible. More importantly, normal sintering is impossible in most cases involving fiber composites even when the materials are compatible, because the merging together of the matrix particles is inhibited by the fibers which tend to prevent the necessary displacements of the densifying powder particles. These difficulties have been, in some cases, partially overcome by forcing the densification process through the application of external pressure at high temperature. However, such procedures can generate many problems, including breaking or damaging of the reinforcing fibers by the external forces applied, limited capability to produce complex shapes (especially in the case of uniaxial hot pressing), and generally high costs resulting from low process productivity and the extensive finishing operations sometimes required.

Additional difficulties can also arise in the blending of powders with whiskers or fibers and in the body formation step, number (3) above, where it is important to maintain a uniform distribution of the composite second phase within the matrix. For example, in the preparation of a whisker-reinforced ceramic composite, the powder and whisker flow processes involved in the mixing procedure and in the formation of the body can result in non-uniformities and undesired orientations of the reinforcing whiskers, with a consequent loss in performance characteristics.

The Commonly Owned Patent Applications describe new processes which resolve some of these problems of traditional ceramic technology as described more fully therein, including the formation of cavities, which may be of complex shape, by inverse replication of a pre-shaped parent metal precursor mold. The present invention combines these processes with additional novel concepts to provide for the formation of ceramic bodies, including complex structures, to net or near net shape, by a technique which does not require the utilization of self-bonding fillers. This invention also provides great flexibility in selecting the pattern or pattern to be replicated, including shapes having re-entrant formations, e.g., recesses or cavities, having mouths which are of smaller diameter or width than their interiors. In other words, the method of the present invention is not limited to producing shapes which can be withdrawn from a die or mold. When making ceramic articles having such re-entrant formations, prior art methods utilizing step (3) above often are not feasible, because the internal pattern or mold cannot be removed after the ceramic body is formed around it.

The present invention provides for fabrication of ceramic composites of a predetermined shape by an unusual oxidation phenomenon which overcomes the difficulties and limitations associated with known processes. This method provides shaped ceramic bodies typically of high strength and fracture toughness by a mechanism which is more direct, more versatile and less expensive than conventional approaches.

The present invention also provides means for reliably producing ceramic bodies having shaped configurations of a size and thickness which are difficult or impossible to duplicate with the presently available technology.

SUMMARY OF THE INVENTION

In accordance with the present invention, there is provided a method for producing a self-supporting ceramic composite body having a negative pattern which inversely replicates a positive pattern of a parent metal precursor. The ceramic composite body comprises a ceramic matrix having a filler embedded therein, the matrix being obtained by oxidation of a parent metal to form a polycrystalline material which consists essentially of the oxidation reaction product of said parent metal with an oxidant, e.g., with a vapor-phase oxidant, and, optionally, one or more metallic constituents. The method comprises the following steps: The parent metal precursor, which has a positive pattern section for inverse replication and a non-replicating section, is emplaced in conforming engagement with a bed of conformable filler under growth control conditions to promote growth of the oxidation reaction product from the positive pattern section, and to inhibit such growth from the non-replicating section. The filler is permeable to the oxidant when required (as in the case where the oxidant is a vapor-phase oxidant) to permit the oxidant to contact the molten parent metal as described below and, in any case, is permeable to infiltration by the growth of oxidation reaction product through the filler. The emplaced parent metal precursor is heated to a temperature region above its melting point but below the melting point of the oxidation reaction product to form a body of molten parent metal, and in that temperature region, the molten parent metal is reacted with the oxidant to form the oxidation reaction product. At least a portion of the oxidation reaction product is maintained in that temperature region and in contact with and between the body of molten metal and the oxidant, to progressively draw molten metal from the body of molten metal through the oxidation reaction product and into contact with the oxidant within the bed of filler for oxidation reaction therein. Concurrently therewith, the negative pattern begins to develop and eventually is formed in the bed of filler as oxidation reaction product continues to form at the interface between the oxidant and previously formed oxidation reaction product. This reaction is continued in that temperature region for a time sufficient to at least partially infiltrate or embed the bed of filler within the oxidation reaction product by growth of the latter to form the composite body having the aforesaid negative pattern. Finally, the resulting self-supporting ceramic composite body is separated from excess filler, and unreacted parent metal, if any.

Other aspects of the invention include one or more of the following features, alone or in combination: emplacing the parent metal precursor in engagement with the bed of conformable filler so that the non-replicating section of the parent metal precursor is free from contact with the bed of filler; utilizing growth control conditions which comprise applying an external dopant to said positive pattern section; incorporating an oxidant into the conformable filler; using a non-oxidizing gas or vacuum process environment; and overlaying the non-replicating section of the parent metal precursor with a barrier means or growth-preventive means which inhibits growth of the oxidation reaction product therethrough. As used herein and in the appended claims, the term "inhibits growth" is broad enough to include the meaning "prevents growth". Further, as used herein and in the appended claims, reference to "applying an external dopant to said positive pattern section" or words of like import are to be understood to mean and include one or both of the following techniques: applying the dopant directly to selected surfaces of the parent metal precursor, and applying the dopant on or to the conformable filler in an area thereof facing, adjacent to or contiguous with the selected surfaces of the parent metal precursor.

In another aspect of the invention, the conformable filler is also self-bonding, at least when required to resist pressure differentials formed across the oxidation reaction product by growth thereof.

In another aspect of the invention, there is provided a self-supporting ceramic composite body having a negative pattern which inversely replicates the positive pattern of a parent metal mold or precursor having, in addition to a section comprising the aforesaid positive pattern, a non-replicating section. The ceramic composite body comprises a polycrystalline matrix having incorporated therein a filler obtained from a bed of conformable filler against which the parent metal precursor is employed at an initial location with the positive pattern thereof in conforming engagement with the filler and the non-replicating section thereof free from contact with the bed of filler. The positive pattern of the parent metal precursor is inversely replicated upon evacuation of the metal precursor from its initial location to form the inversely replicated negative pattern concurrently with oxidation reaction of molten parent metal precursor migrated from the initial location to form the polycrystalline matrix. The matrix consists essentially of a polycrystalline oxidation reaction product of the parent metal precursor with an oxidant and, optionally, one or more metallic constituents, or pores, or both, as described in more detail elsewhere herein.

The materials of this invention can be grown with substantially uniform properties throughout their cross section to a thickness heretofore difficult to achieve by conventional processes for producing shaped ceramic structures. The process which yields these materials also obviates the high costs associated with conventional ceramic production methods, including fine, high purity, uniform powder preparation, green body forming, binder burnout, sintering, hot pressing and hot isostatic pressing. The products of the present invention are adaptable or fabricated for use as articles of commerce which, as used herein, is intended to include, without limitation, industrial, structural and technical ceramic bodies for such applications where electrical, wear, thermal, structural or other features or properties are important or beneficial, and is not intended to include recycled or waste materials such as might be produced as unwanted by-products in the processing of molten metals.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the oxidant or a dopant, most typically within a range of from about 1-40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product of reaction of one or more metals with an oxidant such as those described in this application.

"Oxidant" means one or more suitable electron acceptors or electron sharers and may be a solid, a liquid or a gas (vapor) or some combination of these (e.g., a solid and a gas) at the process conditions.

"Parent metal" refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

"Negative pattern" of the ceramic composite body means the pattern (i.e., geometry) of the body which is inversely replicated from the positive pattern (i.e., geometry) of the parent metal precursor.

"Positive pattern" of the parent metal precursor means the pattern (i.e., geometry) of the parent metal which is inversely replicated to form the negative pattern of the ceramic body. It is important to note that the terms "negative" and "positive" are used in this context only in a sense relative one to the other to denote that the geometry of one pattern is congruent to that of the other. It is not intended in any way to restrict the type of shapes which may comprise a "negative pattern" or a "positive pattern".

"Inversely replicated" means that the negative pattern of the ceramic composite body comprises surfaces which are congruent to the shape of the positive pattern section of the parent metal precursor.

BRIEF DESCRIPTION OF THE DRAWINGS

FIG. 1 is a perspective view of a parent metal precursor shaped to provide on one side thereof a positive pattern and on the opposite side thereof a non-replicating section;

FIG. 1A is a perspective view of the parent metal precursor of FIG. 1 in a position rotated 180° about its major longitudinal axis from its position in FIG. 1;

FIG. 2 is a schematic, cross-sectional view in elevation showing on a slightly reduced scale an assembly of the shaped parent metal precursor of FIGS. 1 and 1A emplaced within a refractory vessel at the interface between a layer of conformable filler supporting a superposed layer of particulate inert material;

FIG. 3 is a perspective view of a ceramic composite body, after grinding the rough surfaces thereof, in accordance with the invention and made by utilizing the assembly and barrier material being at plane X—X;

FIG. 4 is a perspective section view of a ceramic composite body in accordance with the invention, before grinding of the rough surfaces thereof, and made by utilizing the assembly of FIG. 2 with the interface between the layers of filler and barrier material being at plane Y—Y;

FIG. 8 is a perspective view of a parent metal precursor shaped so that the exterior surfaces thereof provide a positive pattern and the surface of the cylindrical bore extending therethrough provides a non-replicating section;

FIG. 8A is a perspective view of the parent metal precursor of FIG. 8 in a position rotated 180° about its major longitudinal axis from its position in FIG. 8;

FIG. 8B is a side view in elevation of the parent metal precursor of FIGS. 8 and 8A with a cylindrical barrier means inserted within and protruding from either end of the cylindrical bore of the precursor;

FIG. 9 is a schematic, cross-sectional view in elevation showing an assembly of the shaped parent metal precursor of FIG. 8B emplaced within a refractory vessel in an assembly including conformable filler and barrier means;

DETAILED DESCRIPTION OF THE INVENTION AND PREFERRED EMBODIMENTS THEREOF

Figure 5:
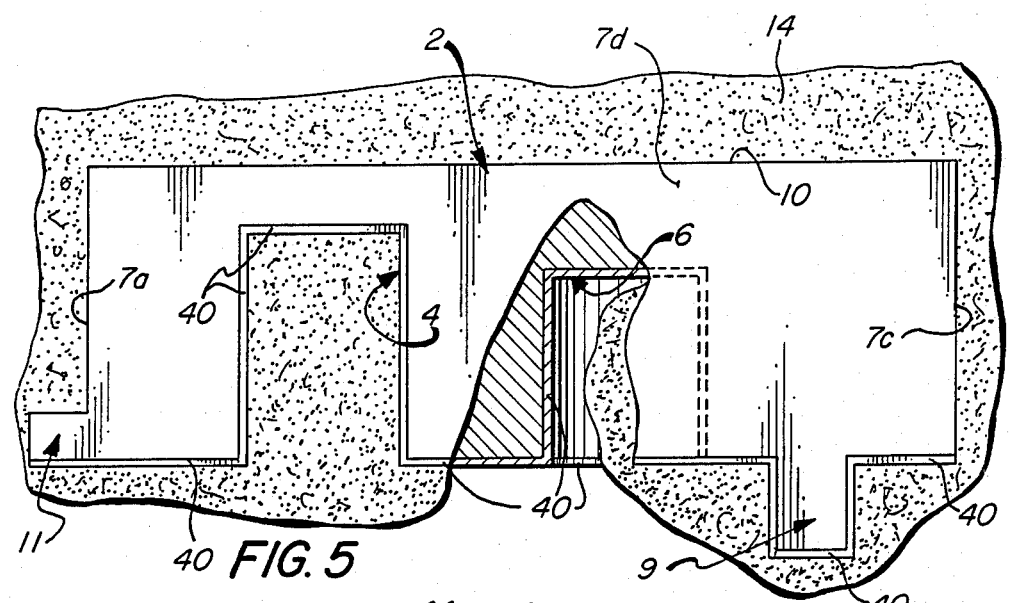
FIG. 5 is a partial elevational view in partial section and on an enlarged scale of the parent metal precursor of FIGS. 1 and 1A, with a layer of external dopant applied to the positive pattern section thereof.

In the practice of the present invention, the parent metal precursor is provided in the form of a shaped article having one section comprised of a positive pattern, the shape or geometry of which is to be inversely replicated as a negative pattern of a finished ceramic composite, and a non-replicating section. By following the practices of the present invention, negative patterns of complex shapes can be inversely replicated in the finished ceramic composite during formation or growth of the ceramic, rather than by shaping or machining a ceramic body. The parent metal precursor may be suitably shaped by any appropriate means; for example, a piece of metal such as a bar, billet or ingot may be suitably machined, cast, molded, extruded or otherwise shaped to provide the parent metal precursor. The parent metal precursor may have grooves, bores, recesses, lands, bosses, flanges, studs, screw threads and the like formed therein as well as having collars, bushings, discs, bars, or the like assembled thereto to provide a positive pattern of the desired configuration. The parent metal precursor may comprise one or more unitary pieces of metal suitably shaped so that when emplaced with the positive pattern section thereof in conforming engagement with a conformable bed of filler, (and the non-replicating section free of the bed of filler) the positive pattern defines a shaped segment of the bed of filler immediately adjacent to the mass of the parent metal precursor. When the parent metal precursor is melted and the oxidation reaction product infiltrates the bed of filler, a shaped negative pattern develops in the resulting ceramic composite body. Thus, in one aspect, the present invention provides the advantage of making the negative pattern by machining or otherwise shaping a metal, rather than by grinding or machining a ceramic, which is a much more difficult and costly process.

In carrying out the method of the invention, the parent metal precursor is emplaced with its positive pattern section in conforming engagement with a bed of conformable filler under growth control conditions which will promote growth of the oxidation reaction product primarily or exclusively from the positive pattern section and into the bed of conformable filler, while inhibiting or preventing growth of oxidation reaction product from the non-replicating section. Growth control conditions may be achieved or enhanced by establishing oxidation reaction kinetics of the parent metal which are more favorable adjacent to, or in the vicinity of, the positive pattern section than those adjacent the non-replicating section. The result is preferential growth or development of the oxidation reaction product within and into the bed of conformable filler from the positive pattern section and inhibition or elimination of such growth from the non-replicating section. For example, a suitable external dopant may be applied onto or at the positive pattern section which enhances growth from the portions of the parent metal precursor to which it is applied, as explained in detail in copending and Commonly Owned U.S. patent application Ser. No. 822,999 described above. Such dopant may be applied externally to the surface of the positive pattern section of the parent metal precursor and/or may be supplied in the conformable filler facing the positive pattern section, preferably adjacent or contiguous to the surface of the positive pattern section. Still further, a solid oxidant and/or liquid oxidant (explained below in detail) may be incorporated into the filler bed in the portion or zone adjacent the positive pattern section. Growth therefore will occur, or is facilitated, in the direction of the oxidant.

Growth control of the polycrystalline oxidation reaction product can be achieved with a suitable barrier means or growth preventive means, such as with the embodiments described in copending U.S. application Ser. No. 861,024, filed May 8, 1986. Effective barriers include materials which are non-wettable by the transported molten parent metal under the process conditions, in that there is essentially no affinity of molten metal for the barrier and growth therefore is prevented. Barriers also may be used which tend to react with the transported molten parent metal to inhibit further growth. In particular, useful barriers include calcium sulfate, calcium silicate, portland cement, metal alloys, such as a stainless steel, and dense or fused ceramics, such as alumina, which may be used with aluminum as the parent metal. The barrier means may also include as a component thereof a suitable combustible or volatile material that is eliminated on heating, or a material which decomposes on heating, in order to render the barrier means permeable or to increase the porosity and permeability of the barrier means. The barrier means overlays or is superimposed onto the non-replicating section of the parent metal, and preferably is of a material that will conform to the surface or shape of this section thereby minimizing or eliminating any undesired growth. A combination of the techniques may be employed, that is, a barrier means may be overlaid or superimposed on the non-replicating section of the parent metal precursor and an external dopant applied to the positive pattern section and/or to the filler facing the positive pattern section. The non-replicating section of the parent metal precursor may be kept free of the bed of filler even if it is not overlaid with a barrier material or means, i.e., it may be left exposed to the atmosphere when conditions are such that growth of oxidation reaction product in the atmosphere is inhibited or precluded except for those surfaces of the parent metal precursor to which an external dopant, or solid or liquid oxidant, is made available.

Although the invention is described below in detail with specific reference to aluminum as the preferred parent metal, other suitable parent metals which meet the criteria of the present invention include, but are not limited to, silicon, titanium, tin, zirconium and hafnium.

A solid, liquid or vapor-phase oxidant, or a combination of such oxidants, may be employed, as noted above. For example, typical oxidants include, without limitation, oxygen, nitrogen, a halogen, sulphur, phosphorus, arsenic, carbon, boron, selenium, tellurium, and compounds and combinations thereof, for example, methane, ethane, propane, acetylene, ethylene, and propylene (as a source of carbon), $SiO_2$ (as a source of oxygen) and mixtures such as air, $H_2/H_2O$ and $CO/CO_2$, the latter two (i.e., $H_2/H_2O$ and $CO/CO_2$) being useful in reducing the oxygen activity of the environment.

Although any suitable oxidants may be employed, specific embodiments of the invention are described below with reference to use of vapor-phase oxidants. If a gas or vapor oxidant, i.e., a vapor-phase oxidant, is used the filler is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants, as in the case where aluminum is the parent metal, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole or predominant oxidizer for the parent metal because oxygen is a significantly stronger oxidant than nitrogen. Air therefore falls within the definition of an "oxygen-containing gas" oxidant but not within the definition of a "nitrogen containing gas" oxidant. An example of a "nitrogen-containing gas" oxidant as used herein and in the claims is "forming gas", which contains about 96 volume percent nitrogen and about 4 volume percent hydrogen.

When a solid oxidant is employed, it may be dispersed through the entire bed of filler or, if used in conjunction with a vapor-phase oxidant, through a portion only of the bed adjacent the parent metal. The oxidant may be used in particulate form admixed with the filler, and/or as a coating on the filler particles. Any suitable solid oxidant may be employed including elements such as boron or carbon, or reducible compounds such as silicon dioxide (as a source of oxygen) or certain borides of lower thermodynamic stability than the boride reaction product of the parent metal. If a solid oxidant is used in combination with a vapor-phase oxidant, the oxidants are selected so that they will be compatible for purposes of the invention.

If a liquid oxidant is employed, the entire bed of filler or a portion thereof adjacent the molten metal is coated, soaked as by immersion, dispersed or otherwise incorporated with the oxidant so as to impregnate all or part of the filler. Reference to a liquid oxidant means one which is a liquid under the oxidation reaction conditions, and so a liquid oxidant may have a solid precursor, such as a salt, which is molten at the oxidation reaction conditions. Alternatively, the liquid oxidant may be a liquid precursor, e.g., a solution of a material, which is used to coat or impregnate part or all of the filler and which is melted or decomposed at the oxidation reaction conditions to provide a suitable oxidant moiety. Examples of liquid oxidants as herein defined include low melting glasses. If a liquid oxidant is used in combination with a vapor-phase oxidant, the liquid oxidant should be used in such a manner so as not to obscure access of the vapor-phase oxidant to the molten parent metal.

For certain conditions, it may be advantageous to employ a solid oxidant and/or a liquid oxidant in conjunction with the vapor-phase oxidant. Such a combination of additional oxidants may be particularly useful in enhancing oxidation of the parent metal to form the oxidation reaction product preferentially within the bed of filler, especially adjacent the positive pattern, rather than beyond its surfaces or in the non-replicating section. That is, the use of such additional oxidants within the bed of filler adjacent the positive pattern section may create an environment within that portion or zone of the bed which is more favorable to oxidation kinetics of the parent metal than the environment outside that portion or zone of the bed. This enhanced environment is beneficial in promoting growth of the oxidation reaction product matrix within the bed to the boundary thereof and eliminating or minimizing overgrowth, i.e., growth outside the boundary of the bed of filler.

The conformable filler utilized in the practice of the invention may be one or more of a wide variety of materials suitable for the purpose. As used herein and in the claims, the term "conformable" as applied to the filler means that the filler is one which can be packed around, laid up against, or wound around a shaped parent metal precursor and will conform to the pattern or shape of the portions or sections of the precursor against which it is emplaced in conforming engagement. For example, if the filler comprises particulate material such as fine grains of a refractory metal oxide, the positive pattern of the parent metal precursor is emplaced in conforming engagement with the filler so that the positive pattern defines a shape in the filler congruent to, i.e., the negative of, the positive pattern. However, it is not necessary that the filler be in fine particulate form. For example, the filler may comprise wire, fibers or whiskers, or such materials as metal wool. The filler also may comprise either a heterogeneous or homogeneous combination of two or more such components or geometric configurations, e.g., a combination of small particulate grains and whiskers. It is necessary only that the physical configuration of the filler be such as to permit the positive pattern of the parent metal precursor to be emplaced in conforming engagement against a mass of the filler with the filler closely conforming to the surfaces of the positive pattern so that the negative pattern ultimately formed in the composite body is the negative of the positive pattern of the parent metal precursor. The latter thus initially forms a shaped segment of the bed of conformable filler.

The conformable filler useful in the practice of the invention is one which, under the oxidation reaction conditions of the invention as described below, is permeable to passage therethrough of the oxidant when the latter is a vapor-phase oxidant. In any case, the filler also is permeable to the growth or development therethrough of oxidation reaction product. During the oxidation reaction, it appears that molten parent metal migrates through the oxidation reaction product being formed to sustain the reaction. This oxidation reaction product is generally impermeable to the surrounding atmosphere and therefore the furnace atmosphere, e.g., air, cannot pass therethrough. As explained in the aforesaid Commonly Owned patent application Ser. No. 823,542, filed Jan. 27, 1986, the impermeability of the growing oxidation reaction product to the furnace atmosphere results in a pressure differential problem when the oxidation reaction product encloses a cavity being formed by migration of molten parent metal. This problem is overcome in the aforesaid Commonly Owned Patent Application by use of a self-bonding conformable filler which, as defined therein, is a filler which, at a temperature above the melting point of the parent metal and close to, but below, the oxidation reaction temperature, partially sinters or otherwise bonds to itself and to the growing layer of oxidation reaction product sufficiently to provide structural strength from the outside of the growing cavity to retain the replicated geometry of the mold in the developing cavity at least until the growing oxidation reaction product structure attains sufficient thickness to be self-supporting against the pressure differential which develops across the wall of growing oxidation reaction product defining the cavity being formed. However, the self-bonding filler is not to sinter or selfbond at too low a temperature because, if it does, it could be cracked by thermal expansion and volume change upon melting of the parent metal as the latter is heated to operating temperature. In other words, the self-bonding filler should retain its conformability to accommodate the difference in volume changes between it and the parent metal while the latter is being heated and melted and then self-bond to provide mechanical strength to the developing cavity as the oxidation reaction progresses. However, the technique of the present invention in many cases avoids the pressure differential problem because the parent metal precursor has a (non-replicating) section thereof from which oxidation reaction product is not grown, at least not to any significant degree, so there is not formed a cavity totally enclosed by growing oxidation reaction product. However, barrier means which are atmosphere impermeable may be used and in some cases deployed so that they block access of the furnace atmosphere to the forming cavity, resulting in creation of a pressure differential across the walls of the growing oxidation reaction product. In such circumstances a self-bonding filler is employed to afford mechanical strength at least during the initial growth stage, as described above.

As used herein and in the claims to characterize conformable fillers, the term "self-bonding" means those fillers which, placed in conforming contact with the positive pattern of the parent metal, retain sufficient conformability to accommodate melting point volume change of the parent metal and differential thermal expansion between the parent metal and the filler and, at least in a support zone thereof immediately adjacent the positive pattern, are intrinsically self-bonding but only at a temperature above the melting point of the parent metal but below and sufficiently close to the oxidation reaction temperature to allow the aforesaid accommodation. Such self-bonding of the filler endows it with sufficient cohesive strength to retain the inversely replicated negative pattern against pressure differentials which develop across it by movement of the parent metal into the filler.

Generally, as noted above, the filler may be a self-bonding filler in any case, though it need not necessarily be such in all cases.

It is not necessary that the entire mass or bed of filler comprise a conformable filler or, when required, a self-bonding filler, although such arrangement is within the purview of the invention. The filler need be conformable and/or self-bondable only in that portion of the bed of filler adjacent to and shaped by the positive pattern of parent metal. In other words, the filler need be conformable and/or self-bondable only to a depth sufficient, in the case of conformability, to conform to the positive pattern of the parent metal precursor, and, in the case of self-bondability, to provide sufficient mechanical strength in a particular situation. The balance of the filler bed need not be conformable and/or self-bonding.

In any case, the filler should not sinter, fuse or react in such a way as to form an impermeable mass so as to block the infiltration of the oxidation reaction product therethrough or, when a vapor-phase oxidant is used, passage of such vapor-phase oxidant therethrough. Further, the filler should be sufficiently conformable to accommodate the thermal expansion differential between the parent metal and the filler upon heating of the assembly, and the volume change of the metal upon melting thereof while retaining close conformity to the positive pattern of the parent metal precursor.

In practicing the process of this invention, the assembly of the parent metal, bed of filler and, if used, barrier means or growth preventive means, is heated to a temperature above the melting point of the metal but below the melting point of the oxidation reaction product, to provide a body or pool of molten metal in an oxidizing environment. On contact with the oxidant, the molten metal will react to form a layer of oxidation reaction product. Upon continued exposure to the oxidizing environment, within an appropriate temperature region, the remaining molten metal is progressively drawn into and through the oxidation reaction product in the direction of the oxidant and, on contact with the oxidant, forms additional oxidation reaction product. At least a portion of the oxidation reaction product is maintained in contact with and between the molten parent metal and the oxidant so as to cause continued growth of the polycrystalline oxidation reaction product in the bed of filler, thereby embedding filler within the polycrystalline oxidation reaction product. The polycrystalline matrix material continues to grow so long as suitable oxidation reaction conditions are maintained.

The process is continued until the oxidation reaction product has infiltrated and embedded the desired amount of filler. The resulting ceramic composite product includes filler embedded by a ceramic matrix comprising a polycrystalline oxidation reaction product and including, optionally, one or more non-oxidized or metallic constituents of the parent metal, or voids, or both. Typically, in these polycrystalline ceramic matrices, the oxidation reaction product crystallites are interconnected in more than one dimension, preferably in three dimensions, and the metal inclusions or voids may be partially interconnected. When the process is not conducted beyond the exhaustion of the parent metal, the ceramic composite obtained is dense and essentially void-free. When the process is taken to completion, that is, when as much of the metal as possible under the process conditions has been oxidized, pores in place of the interconnected metal will have formed in the ceramic composite. The resulting ceramic composite product of this invention possesses substantially the original dimensions and (the negative of) the geometric configuration of the positive pattern section of the parent metal precursor, adjusted for melting point and thermal expansion differential volume changes during processing of the parent metal precursor with respect to the composite body formed and cooled.

Referring now to the drawings, it should be noted that all elements thereof are not necessarily to scale. For example, in FIGS. 9-11 the thickness of the illustrated paper or thin cardboard components is exaggerated for improved clarity of illustration. FIG. 1 shows a parent metal precursor 2 shaped to have a pattern formed therein, referred to as a positive pattern, which essentially comprises a rectangular groove 4 and a cylindrical shaped cavity 6, which can be a smooth bore as illustrated or a threaded bore, formed in a surface 8 and a rectangular land 9 projecting upwardly (as viewed in FIG. 1) from surface 8. Groove 4, cavity 6 and land 9 are formed in surface 8 of the parent metal precursor 2 and together therewith comprise the positive pattern which will be inversely replicated as described below in connection with the ceramic article of FIG. 3. Parent metal precursor 2 also has a shoulder flange 11 extending from side 7a thereof, ne side of shoulder flange 11 being flush with and forming an extension of surface 8. The remainder of parent metal precursor 2 comprises the surface 10 (FIG. 1A) which is opposite surface 8 and the four sides 7a, 7b, (FIG. 1) 7c and 7d (FIGS 1A and 2). Surface 10, sides 7a-7b and the portion of shoulder flange 11 not comprising part of surface 8 comprise the nonreplicating section of parent metal precursor 2 when the interface between particulate inert material 16 and filler 14 is at plane X—X (FIG. 2) as described below. As used herein and in the appended claims, the term "inert material" refers to a particulate material which is substantially inert to and non-wettable by the molten parent metal under the process conditions, i.e, the melting and oxidation reaction conditions.

FIG. 2 shows parent metal precursor 2 placed within a refractory vessel 12, such as an alumina vessel, containing a two-layer bed of particulate material, the lower portion of vessel 12 being filled with a conformable filler 14 and the upper portion of vessel 12 (generally, above the plane X—X) being filled with a conformable, inert material 16. The non-replicating section of parent metal precursor 2 is that portion thereof which is overlaid by the inert material 16 and consequently is free from contact with the bed of filler 14. Parent metal precursor 2 may comprise any suitable parent metal, for example, aluminum parent metal. Parent metal precursor 2 is positioned with its positive pattern 4, 6, 8, 9 in conforming engagement with the bed 14 of conformable filler, so that the conformable filler fills groove 4 and cylindrical shaped cavity 6 and abuts surface 8 and the surfaces of land 9, conforming to the respective changes of the positive pattern. The conformable filler 14 thus extends above the plane X—X only within groove 4 and cylindrical cavity 6. The non-replicating section of parent metal precursor 2 is thus embedded within the inert material 16. The conformable filler 14 does not extend beyond the opposite open ends of groove 4 so that at the opposite ends of groove 4 there is an interface between conformable filler 14 and inert material 16. If necessary or desirable, a suitable retaining means such as a paper, cardboard, plastic film, metal plate (preferably a perforated metal plate) or screen may be placed at each opposite end of groove 4 in order to preclude seepage of conformable filler 14 and/or intermingling of inert material 16 with conformable filler 14 during assembly.

Upon heating of the assembly of FIG. 2 to a sufficiently high temperature to melt the parent metal of precursor 2, a vapor-phase oxidant, which permeates the bed of barrier material and conformable filler and therefore is in contact with the molten metal, oxidizes the molten metal and growth of the oxidation reaction product resulting therefrom infiltrates the bed of conformable filler 14. The growing oxidation reaction product will not penetrate inert material 16 which therefore serves effectively to retain the molten metal for growth of oxidation reaction product therefrom. For example, when the parent metal is an aluminum parent metal and air is the oxidant, the oxidation reaction temperature may be from about 850° C. to about 1450° C., preferably from about 900° C. to about 1350° C., and the oxidation reaction product is alumina, typically alpha-alumina. The molten metal migrates through the forming skin of oxidation reaction product from the volume formerly occupied by parent metal precursor 2 and, as the reaction continues, the space within inert material bed 16 formerly occupied by parent evacuated by the migration of molten parent metal through the oxidation reaction product to the outer surface thereof, where it contacts the vapor-phase oxidant within the bed of conformable filler 14 and is oxidized to form additional oxidation reaction product. Movement of particles of inert material 16 into the space evacuated by molten parent metal, i.e., into the initial location of parent metal precursor 2, is acceptable as it should have no adverse effect on the growing ceramic body. However, if desired or necessary due to the geometry of the positive pattern utilized, a rigid retainer means may be used to preclude such movement. For example, a suitable rigid retainer could be placed on surface 10 of parent metal precursor 2 to retain the particulate inert material 16 in place as molten parent metal infiltrates the bed of filler 14.

The resultant oxidation reaction product comprises a polycrystalline ceramic material which may contain inclusions therein of unoxidized constituents of the molten parent metal. Upon completion of the desired amount of growth of ceramic matrix, the assembly is allowed to cool and the resultant ceramic composite, whose dimensions are indicated by dotted line 18 in FIG. 2, is separated from the inert material 16 and excess conformable filler and unreacted parent metal, if any, left within vessel 12. Unreacted parent metal, if any, and any thin layer of oxide formed at the interface with inert material 16 can readily be separated from the ceramic composite. The ceramic composite structure thus formed will inversely replicate the shape of the positive pattern and the remainder of the ceramic body may be shaped as desired by machining or grinding or otherwise forming it to a desired outer shape. For example, as illustrated in FIG. 3, the finish-shaped ceramic composite body 20 has a replicated surface, i.e., a negative pattern, which is the negative of the positive pattern defined by groove 4, cavity 6, surface 8 and flange 9 of parent metal precursor 2. The replicated negative pattern of ceramic composite body 20 includes a slot 21, which is the replicated negative pattern of flange 9, and a cylindrical shaped boss 22 which is the replicated negative pattern of cavity 6. The dimensions of slot 21 are congruent to those of flange 9 and the dimensions of boss 22 are congruent to those of cavity 6. Similarly, a rectangular-shaped land 24 is congruent to, and comprises the inversely replicated negative pattern of, groove 4. Surface 26 of composite body 20 is likewise the inversely replicated negative pattern of surface 8 of parent metal precursor 2. The remaining portions of composite body 20, e.g., sides 28a and 28b, plus the two sides (not visible in FIG. 3) respectively opposite sides 28a and 28b, and the surface (not visible in FIG. 3) opposite surface 26 are formed by machining, grinding or otherwise shaping the generally loaf-shaped exterior portion of the ceramic body grown below plane X—X, whose shape is generally indicated in FIG. 2 by dash line 18. Because shoulder flange 11 is embedded within inert material 16 (when the interface between the inert material 16 and filler 14 is at plane X—X), with only the portion of shoulder flange 11 which comprises an extension of surface 8 in contact with filler 14, shoulder flange 11 is not replicated in ceramic body 20. The effect of shoulder flange 11 in this embodiment is to increase the length of ceramic body 20 (as measured along its major longitudinal axis) because the area of conformable engagement of filler 14 with precursor 2 (at surface 8) is increased by the width of shoulder flange 11. For example, ignoring any foreshortening occasioned by grinding the ceramic body 20 to provide the finished surfaces 28, 28a, etc. thereof, the length of ceramic body 20 between land 24 and side surface 28a thereof is shown in FIG. 3 by the dimension L' which is substantially the same as dimension L in FIG. 1. If shoulder flange 11 were omitted from parent metal precursor 2, length L' of ceramic body 20 (FIG. 3) would be substantially the same as dimension s in FIG. 1.

By selecting an appropriate material for the filler and maintaining the oxidation reaction conditions for a time sufficient to evacuate substantially all the molten parent metal from the barrier means comprised of bed 16 in the illustrated embodiment, a faithful inverse replication of the positive pattern of parent metal presursor 2 is attained by surface 26, land 24, boss 22 and slot 21 of ceramic body 20. If a quantity of unreacted parent metal remains on the ceramic body, it can readily be removed from the resultant ceramic body to expose the faithful inverse replication. While the illustrated shape of the parent metal precursor 2 (and therefore of the replicated shape 21, 22, 26, 24) is relatively simple, positive patterns of much more complex geometry can be formed in parent metal precursor 2 and inversely replicated with fidelity as the negative pattern of the composite ceramic body by the techniques of the present invention.

In an alternate embodiment, the parent metal precursor 2 could be embedded more deeply within the bed of conformable filler 14, or the height of bed 14 increased, to the level indicated by plane Y—Y, or to any level intermediate planes X—X and Y—Y. Conformable filler 14 could even extend above the level of plane Y—Y and cover a portion of surface 10 of parent metal precursor 2 provided that a portion thereof is left free from contact with the filler to avoid formation of a cavity totally enclosed by oxidation reaction product. The size of the positive pattern section increases as the height of the bed 14 of filler increases, to include that portion of the sides 7a, 7b, 7c and 7d of parent metal precursor 2 which is embedded by conformable filler 14. Growth of oxidation reaction product would then occur not only through surface 8 and the surfaces of groove 4, cavity 6 and flange 9, but also through that portion of the sides 7a–7d of parent metal precursor 2 surrounded by and in contact with filler 14. In such case, the non-replicating section of parent metal precursor 2 would be that portion left clear of filler 14 such as, for example, only surface 10 of parent metal precursor 2 when conformable filler 14 extends to plane Y—Y.

FIG. 4 shows in sectional perspective view a ceramic body 30 resulting from practicing the invention with the assembly of FIG. 4 in which the interface between filler 14 and inert material 16 is at plane Y—Y so that filler 14 is in conforming engagement with every surface of metal precursor 2 except surface 10. In this arrangement, surface 10 comprises the entirety of the non-replicating section of parent metal precursor 2 whose positive pattern is comprised of surface 8 and sides 7a, 7b, 7c and 7d and thus includes, in addition to groove 4, cavity 6 and flange 9, shoulder flange 11. Carrying out the process of the invention with filler 14 extending to the level of plane Y—Y results in growth of oxidation reaction product to form a ceramic composite body generally as shown by dash line 19 in FIG. 2. The resultant ceramic body 30, after being separated from excess filler 14 and inert material 16, is shown in FIG. 4 before being ground or machined (if desired) along surfaces generally analogous to the side surfaces 28a, 28b and adjacent side and bottom surfaces (not visible in FIG. 3) of ceramic body 20 of FIG. 3. Ceramic body 30 is shown in FIG. 4 in the condition in which it is removed from vessel 12, and has outer side surface 32, a bottom surface 34 (as viewed in FIG. 4) and interior wall surfaces 36a, 36b and 36c which, respectively, comprise negative patterns inversely replicating side surfaces 7a, 7b and 7c of parent metal precursor 2. (The interior wall surface inversely replicating side surface 7d of parent metal precursor 2 is omitted from the section view of FIG. 4, which is taken along a plane parallel to but inwardly of the omitted interior wall inversely replicating side surface 7d.) Growth of the oxidation reaction product through those portions of filler 14 in conforming engagement with side surfaces 7a–7d in FIG. 2 results in the formation of facing interior walls 36a, 36b, 36c, and a fourth interior wall (not shown, which inversely replicates surface 7d) to provide a generally rectangular-shaped recess 38 defined by the aforesaid interior walls and surface 26'. Surface 26' comprises a negative pattern inversely replicating surface 8 of precursor 2 and generally corresponds to surface 26 of the FIG. 3 embodiment. Surface 26' has therein a slot 21', boss 22' and land 24' generally corresponding to slot 21, boss 22 and land 24 of the FIG. 3 embodiment. In addition, ceramic body 30 has, at the foot of interior wall 36, a slot or channel 40 which is the negative pattern inversely replicating shoulder flange 11 of precursor 2. Ceramic body 30 optionally may be finished by, e.g., being ground or machined to provide flat surfaces as generally suggested by the dash lines (unnumbered) in FIG. 4.

It will be appreciated upon consideration of the foregoing description of the different shaped ceramic bodies obtained by changing the relative position of precursor 2 to the interface between filler 14 and inert material 16, that the molten parent metal provided by precursor 2 will migrate and grow as the oxidation reaction product into the bed of filler 14 through those areas of precursor 2 which are in contact with or engage a surface of precursor 2. Assuming the presence of materials and conditions to provide growth of oxidation reaction product through all surfaces of precursor 2 which are not blocked by contact with a barrier means, it will be appreciated that molten parent metal will evacuate the volume originally occupied by precursor 2 and grow as oxidation reaction product into filler 14, faithfully inversely replicating in the resultant self-supporting ceramic composite body the configuration of the interface between the positive pattern of parent metal precursor 2 and the permeable filler 14 placed in conforming engagement therewith. For example, if the interface between filler 14 and inert material 16 were placed at a level between planes X—X and Y—Y, the height of interior walls 36a, 36b, 36c and the interior wall replicating surface 7d, and thus the depth of recess 38, would be reduced correspondingly. For example, if the interface between filler 14 and inert material 16 were at plane Z—Z, the height of the aforesaid interior walls would be less than that of boss 22' or land 24'.

It should be understood that the filler properties of being permeable and conformable as described above are properties of the overall composition of the filler and that individual components of the filler need not have any or all of these characteristics. Thus, the filler may comprise either a single material, a mixture of particles of the same material but of different mesh size, or mixtures of two or more materials. In the latter case, some components of the filler may not be sufficiently conformable or permeable but the filler of which it is a component part will have the requisite conformity or permability characteristics because of the presence of other materials. A large number of materials which make useful fillers in the ceramic composite by imparting desired qualities to the composite also will have the permeable and conformable qualities described above.

With respect to individual components of the filler, one suitable class of filler component includes those chemical species which, under the temperature and oxidizing conditions of the process, are not volatile, are thermodynamically stable and do not react with or dissolve excessively in the molten parent metal. Numerous materials are known to those skilled in the art as meeting such criteria in the case where an aluminum parent metal is employed with air or oxygen as the oxidant. Such materials include the single-metal oxides of: aluminum, $Al_2O_3$; cerium, $CeO_2$; hafnium, $HfO_2$; lanthanum, $La_2O_3$; neodymium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a large number of binary, ternary, and higher order metallic compounds such as magnesium aluminate spinel, $MgO.Al_2O_3$, are contained in this class of stable refractory compounds.

A second class of suitable filler components are those which are not intrinsically stable in the oxidizing and high temperature environment of the preferred embodiment, but which, due to relatively slow kinetics of the degradation reactions, can be incorporated as a filler phase within the growing ceramic body. An example is silicon carbide. This material would oxidize completely under the conditions necessary to oxidize, for example, aluminum with oxygen or air in accordance with the invention were it not for a protective layer of silicon oxide forming and covering the silicon carbide particles to limit further oxidation of the silicon carbide. The protective silicon oxide layer also enables silicon carbide particles to sinter or bond lightly to themselves and to other components of the filler under the oxidation reaction conditions of the process for aluminum parent metal with air or oxygen as the oxidant.

A third class of suitable filler components are those, such as carbon fibers, which are not, on thermodynamic or on kinetic grounds, expected to survive the oxidizing environment or the exposure to molten aluminum involved with a preferred embodiment, but which can be made compatible with the process if 1) the environment is made less active, for example, through the use of $CO/CO_2$ as the oxidizing gases, or 2) through the application of a coating thereto, such as aluminum oxide, which makes the species kinetically non-reactive in the oxidizing environment or on exposure to the molten metal.

As a further embodiment of the invention and as explained in the Commonly Owned Patent Applications, the addition of dopant materials to the metal can favorably influence the oxidation reaction process. The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants (1) may be provided as alloying constituents of the parent metal, (2) may be applied to at least a portion of the surface of the parent metal, or (3) may be applied to the filler or to a part of the filler bed, e.g., to the depth of filler necessary to conform to the positive pattern of the parent metal precursor, or any combination of two or more of techniques (1), (2) and (3) may be employed. For example, an alloyed dopant may be used in combination with an externally applied dopant. In the case of technique (3), where a dopant or dopants are applied to the filler, the application may be accomplished in any suitable manner, such as by dispersing the dopants throughout part or the entire mass of filler as coatings or in particulate form, preferably including at least a portion of the bed of filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A convenient manner of applying any of the dopant material is to merely soak the entire bed in a liquid (e.g., a solution), of dopant material. A source of the dopant may also be provided by placing a rigid body of dopant in contact with and between at least a portion of the parent metal surface and the filler bed. For example, a thin sheet of silicon-containing glass (useful as a dopant for the oxidation of an aluminum parent metal) can be placed upon a surface of the parent metal. When the aluminum parent metal (which may be internally doped with Mg) overlaid with the silicon-containing material is heated in an oxidizing environment (e.g., in the case of aluminum in air, between about 850° C. to about 1450° C., preferably about 900° C. to about 1350° C.), growth of the polycrystalline ceramic material into the permeable bed occurs. In the case where the dopant is externally applied to at least a portion of the surface of the parent metal, the polycrystalline oxide structure generally grows within the permeable filler substantially beyond the dopant layer (i.e., to beyond the depth of the applied dopant layer). In any case, one or more of the dopants may be externally applied to the parent metal surface and/or to the permeable bed. Additionally, dopants alloyed within the parent metal and/or externally applied to the parent metal may be augmented by dopant(s) applied to the filler bed. Thus, any concentration deficiencies of the dopants alloyed within the parent metal and/or externally applied to the parent metal may be augmented by additional concentration of the respective dopant(s) applied to the bed, and vice versa.

Useful dopants for an aluminum parent metal, particularly with air as the oxidant, include, for example, magnesium metal and zinc metal, in combination with each other or in combination with other dopants as described below. These metals, or a suitable source of the metals, may be alloyed into the aluminum-based parent metal at concentrations for each of between about 0.1-10% by weight based on the total weight of the resulting doped metal. Concentrations within this range appear to initiate the ceramic growth, enhance metal transport and favorably influence the growth morphology of the resulting oxidation reaction product. The concentration for any one dopant will depend on such factors as the combination of dopants and the process temperature.

Other dopants which are effective in promoting polycrystalline oxidation reaction growth, for aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying material to be added at a lower temperature.

One or more dopants may be used depending upon the circumstances, as explained above. For example, in the case of an aluminum parent metal and with air as the oxidant, particularly useful combinations of dopants includes (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting. In addition, an extremely thin (e.g., less than about 2 μm) layer of magnesium oxide has been observed on the external surface which can be easily removed as by grit blasting, if desired.

Additional examples of dopant materials useful with an aluminum parent metal, include sodium, lithium, calcium, boron, phosphorus and yttrium which may be used individually or in combination with one or more dopants depending on the oxidant and process conditions. Sodium and lithium may be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into the permeable filler in selected areas. Thus, growth of the polycrystalline ceramic material into the permeable bed can be controlled by the localized placement of the dopant material upon the parent metal surface. The applied coating or layer of dopant is thin relative to the thickness of the parent metal body, and growth or formation of the oxidation reaction product into the permeable bed extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal when using air or oxygen as the oxidant, quantities as low as about 0.0001 gram of silicon per square centimeter of externally doped surface of parent metal or about 0.00003 gram of silicon per gram of parent metal to be oxidized may be employed to produce the polycrystalline ceramic growth phenomenon. One or more other dopants may be used, for example, the silicon dopant material may be supplemented by a dopant material comprising a source of magnesium and/or zinc. It also has been found that a ceramic structure is achievable from an aluminum based parent metal using air or oxygen as the oxidant by using one or both of MgO and $MgAl_2O_4$ as the dopant in an amount greater than about 0.003 gram of Mg per square centimeter of externally doped surface of parent metal or greater than about 0.0008 gram of Mg per gram of parent metal to be oxidized.

Dopant application techniques (2) and (3) described above, i.e., external application of dopant to at least a portion of the surface of parent metal or to the filler bed or part of the filler bed, may be utilized in an embodiment of the invention in which growth control of the oxidation reaction product is attained by such external application of the dopant. Materials and conditions may be selected such that significant growth of oxidation reaction product will not occur from those portions of the parent metal precursor lacking the external dopant and the parent metal precursor is not alloyed with sufficient dopant to facilitate the oxidation reaction. When an external dopant is used in conjunction with the positive pattern section only of the parent metal precursor, the barrier means may be omitted from the non-replicating section. However, it is to be understood that the external application of the dopant may also be used in combination with a barrier material.

The technique of utilizing an external dopant is illustrated in FIG. 5, wherein parent metal precursor 2 is embedded within a bed of conformable filler 14, with all surfaces of parent metal precursor 2, including the non-replicating section thereof, in conforming engagement with conformable filler 14. This type of embedment would be attained, for example, by replacing the bed of inert material 16 in FIG. 2 with conformable filler so that the refractory vessel 12 is entirely filled with a bed of conformable filler 14 having parent metal precursor 2 embedded therein. In the FIG. 5 embodiment, external application of a dopant is utilized to give the same effect as would be attained in the FIG. 2 embodiment if the interface between the bed 14 of conformable filler material and the bed 16 of particulate inert material were at the level of plane X—X. In order to attain this effect, a layer 40 of dopant material is applied to cover the entire surface of the positive pattern section comprised of surface 8 which, as described above with respect to the embodiments of FIGS. 1–4, has a groove 4, cavity 6 and flange 9 formed therein, with shoulder flange 11 forming an extension thereof. Surfaces 10, 7a, 7c, 7b and 7d and the surfaces of shoulder flange not coated with dopant material 40 together comprise the non-replicating section of parent metal precursor 2 in the embodiment illustrated in FIG. 5 (surface 7b is not visible in FIG. 5). The oxidation reaction conditions utilized with the FIG. 5 embodiment are such that layer 40 of dopant material is required to promote growth of the oxidation reaction product and, in the absence of the layer 40 of dopant material, growth of oxidation reaction product is precluded or inhibited sufficiently to avoid any significant formation of oxidation reaction product from the surfaces of parent metal precursor 2 comprising the non-replicating section thereof. Thus, in this embodiment, parent metal precursor 2 would contain no or insufficient alloyed dopant to promote growth of oxidation reaction product under the conditions obtaining. Factors such as the composition of the parent metal, the composition and amount of oxidant, and the operating temperature will determine whether a particular parent metal requires the presence of a dopant in order to form oxidation reaction product at an appreciable rate. With the arrangement shown in FIG. 5, and under conditions wherein the layer 40 of dopant material is required to promote significant oxidation reaction product growth, no significant growth will occur from the non-replicating section even though it is in conforming engagement with a bed of conformable filler 14 which is permeable to growth of oxidation reaction product therethrough. In lieu of, or in addition to the layer 40 of dopant material, a suitable dopant may be utilized in those portions or zones of the bed 14 of conformable filler facing, adjacent to and/or contiguous with the positive pattern section of parent metal precursor 2. Still further, a solid or liquid oxidant may be used in such zones of the bed of filler to establish favorable growth kinetics at the positive pattern section. The product resulting from the assembly partially illustrated in FIG. 5 would be similar or identical to the ceramic composite body illustrated in FIG. 3.

Figure 6:
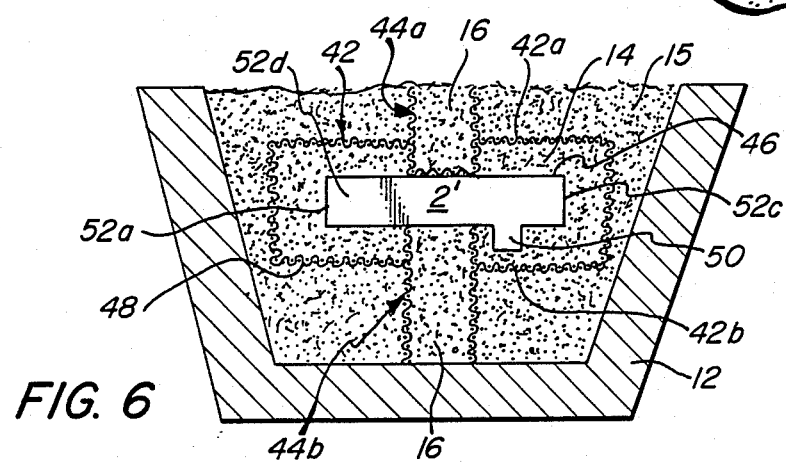
FIG. 6 is a schematic, cross-sectional view in elevation of an assembly of a shaped parent metal precursor emplaced within a barrier means enclosure and contained within a refractory vessel, with the positive pattern section of the parent metal precursor in conforming engagement with a conformable filler.

FIG. 6 shows another embodiment of the invention in which a parent metal precursor 2' is embedded within a bed 14 of conformable filler which itself is retained within a generally rectangular enclosure 42 made of a material comprising a foraminous barrier material. Enclosure 42 is substantially filled with conformable filler 14 and parent metal precursor 2' embedded therein. The foraminous barrier material of which enclosure 42 is made may comprise, for example, a stainless steel screen. The enclosure 42 has a circular opening formed in its upper and lower surfaces 42a, 42b (see FIG. 6) and a pair of circular cylindrical shaped tubes 44a, 44b are inserted through these openings and extend to respective opposite surfaces 46, 48 of parent metal precursor 2'. Tubes 44a, 44b are each filled with an inert material 16, and the tubes may themselves be formed of a foraminous barrier material or a screen identical or similar to that of enclosure 42. Parent metal precursor 2' has in this embodiment a flange 50 protruding from surface 48 thereof. Visible in FIG. 6 are side surfaces 52a, 52c and front surface 52d of parent metal precursor 2'. ("Side" and "front" are used in the foregoing sentence as viewed in FIG. 6). The back (as viewed in FIG. 6) surface of parent metal 2' is not visible in FIG. 6. It is to be understood that all described surfaces of parent metal precursor 2' are in conforming engagement with filler 14 contained within the enclosure 42 except for circular portions of opposite surfaces 46 and 48 which are overlaid by the particles of inert material 16 contained within, respectively, tubes 44a and 44b. Thus, the entire surface of parent metal precursor 2' comprises the positive section thereof except for the two circular segments overlaid by inert material 16, which segments comprise respective non-replicating sections of parent metal precursor 2'. Inasmuch as enclosure 42 provides a barrier to growth of oxidation reaction product, the bed 15 of particulate material need be neither a conformable filler nor an inert material. Indeed, the assembly comprised of the enclosure 42 and tubes 44a, 44b may be supported by any suitable means within refractory vessel 42. It is convenient, however, to support the assembly in a bed of particulate material 15 which may, but need not be, an inert material. If the enclosure 42 were not itself a barrier to growth of oxidation reaction product then bed 15, or at least the portion thereof adjacent to and embedding enclosure 42, should comprise an inert material.

Upon heating of the assembly of FIG. 6 to a sufficiently high temperature to melt the parent metal, and upon contact of the molten parent metal with a suitable liquid, solid and/or vapor-phase oxidant, oxidation of the molten metal take place and growth of oxidation reaction product from the positive pattern section of parent metal precursor 2' takes place. As the reaction is allowed to progress to attain the desired growth of the ceramic body (optionally, to the exhaustion of parent metal from the volume initially occupied by parent metal precursor 2'), oxidation reaction product will grow to a boundary defined by the inner surface of the enclosure 42. The volume of enclosure 42 relative to the volume of parent metal precursor 2' is readily selected so that a volume of oxidation reaction product will result which will fill the interstices of the volume of conformable filler 14 contained within the enclosure 42.

Figure 7:
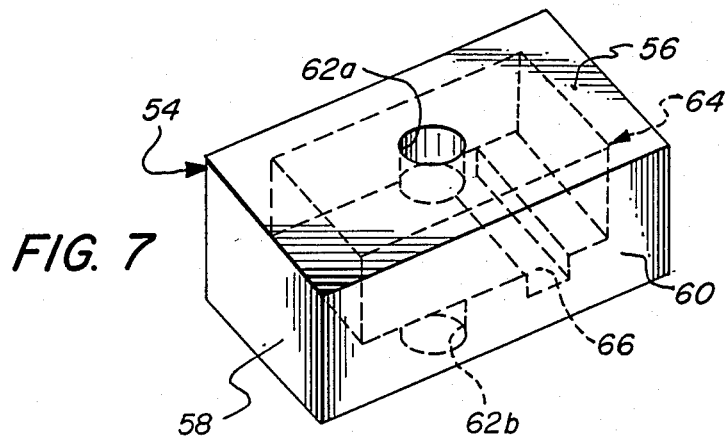
FIG. 7 is a perspectie view of a ceramic composite body in accordance with the invention and made by utilizing the assembly of FIG. 6.

FIG. 7 shows a resultant ceramic composite body 54 obtained by utilizing the assembly of FIG. 6. Ceramic composite body 54 has a generally flat, top surface 56 and side surfaces 58, 60, visible in FIG. 7. These surfaces generally conform to the corresponding interior surfaces of the enclosure 42. A cylindrical opening 62a extends to top surface 56 and generally corresponds to the volume of tube 44a contained within enclosure 42. A corresponding cylindrical opening 62b extends to the bottom surface (unnumbered) of ceramic composite body 54 and corresponds to the volume of tube 44b enclosed within enclosure 42. The volume initially occupied by parent metal precursor 2' is evacuated during oxidation of the parent metal and results in a generally rectangular shaped cavity 64 formed within ceramic composite 54 and shown in dash outline in FIG. 7. The lower surface (as viewed in FIG. 7) of cavity 64 contains a groove 66 formed therein which is an inverse replication of the surface of flange 50 of parent metal precursor 2'. The tubes 44a, 44b are filled with particles of an inert material 16 in the assembly of FIG. 6. Since the inert material is permeable, it provides, via tubes 44a, 44b, access to the surrounding atmosphere by the cavity 64 being formed during the reaction, so that cavity 64 is at no time entirely closed and sealed off from the surrounding atmosphere by growing oxidation reaction product. As explained above, this avoids the problem of a pressure differential acting on the growing, hollow body of oxidation reaction product due to the fact that the oxidation reaction product is impermeable to the surrounding air or atmosphere.

Referring now to FIGS. 8, 8A and 8B, there is shown another embodiment of a parent metal precursor 68, for example, an aluminum parent metal precursor, which is of generally rectangular configuration, having surfaces 70, 74 and sides 72a, 72b, 72c and 72d. Parent metal precursor 68 has a rectangular shaped land 76 which projects from its surface 74. Land 76 extends substantially parallel to and coextensively with sides 72a and 72d. A cylindrically shaped bore 78 extends through parent metal precursor 68, from surface 70 to surface 74 thereof.

FIG. 9 shows parent metal precursor 68 placed within a refractory vessel 80 in an assembly of the parent metal precursor 68 with conformable filler and a barrier means or growth preventive means. In this embodiment, a cylindrical barrier means 82, which inhibits or prevents growth, is dimensioned and configured so that it may be slidably inserted into cylindrical shaped bore 78 in engagement with the entire cylindrical surface thereof. As shown in FIGS. 8B and 9, cylindrical barrier means 82 is longer than bore 78 and a portion thereof projects outwardly at either end thereof. The cross section view of FIG. 9 shows the construction of cylindrical barrier means 82 which comprises, in the illustrated embodiment, a central core 82b, which may be made of plaster of paris, contained within a heavy paper or thin cardboard tube 82a used to establish the initial configuration of the barrier. On heating, the paper or cardboard burns off or volatilizes and does not participate further in the process. A rectangular shaped barrier means 88, open at its upper and lower ends (as seen in FIG. 9), is shown in cross section in FIG. 9 and is comprised of four walls which extend, respectively, parallel to and spaced from sides 72a, 72b, 72c and 72d of parent metal precursor 68. Barrier means 88 thus has the shape of a short section of a rectangular duct. Only three of the walls of means 88 are visible in FIG. 9, to wit, wall 88b and, in cross section, walls 88a and 88c. As shown with respect to the latter two walls, the inner surface of each is comprised of a layer of plaster of paris which, in walls 88a and 88c, is shown in cross section as layers 88a' and 88c'. The outer, heavy paper or cardboard layer is shown in cross section as layers 88a" and 88c".

Parent metal precursor 68 together with cylindrical barrier means 82 inserted in the cylindrical bore thereof, is embedded within a bed of conformable filler 84 contained within rectangular barrier means 88. Barrier means 88 and its contents are embedded within a bed of inert material 86, from which it is separated by barrier means 88. In this embodiment, the non-replicating section of parent metal precursor 68 is provided by the cylindrical surface of cylindrical shaped bore 78, which surface engages and is congruent to the outer surface of cylindrically shaped barrier means 82. The remaining surfaces of parent metal precursor 68 comprise its positive pattern, as growth of oxidation reaction product from parent metal precursor 68 will, under suitable conditions as described above, occur from these surfaces through the bed of conformable filler 84. The growth of oxidation reaction product is constrained to stop as the growing oxidation reaction product contacts barrier means 82 and 88 and inert material 86, respectively. The arrangement shown in FIG. 9 will produce a ceramic body having a configuration identical or substantially similar to that described above and illustrated in FIG. 7 as being obtained from the assembly of FIG. 6. Accordingly, it is not necessary to repeat the description of the ceramic body of FIG. 7.

Figure 10:
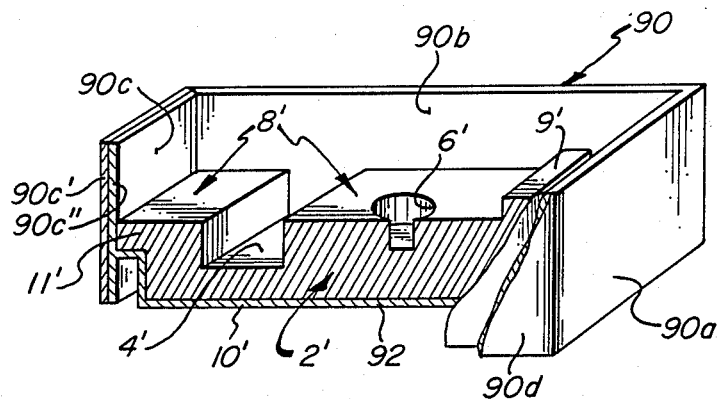
FIG. 10 is a perspective view with parts broken away and sectioned of a parent metal precursor shaped similarly or identically to that of FIGS. 1 and 1A and encased within a barrier means.
Figure 11:
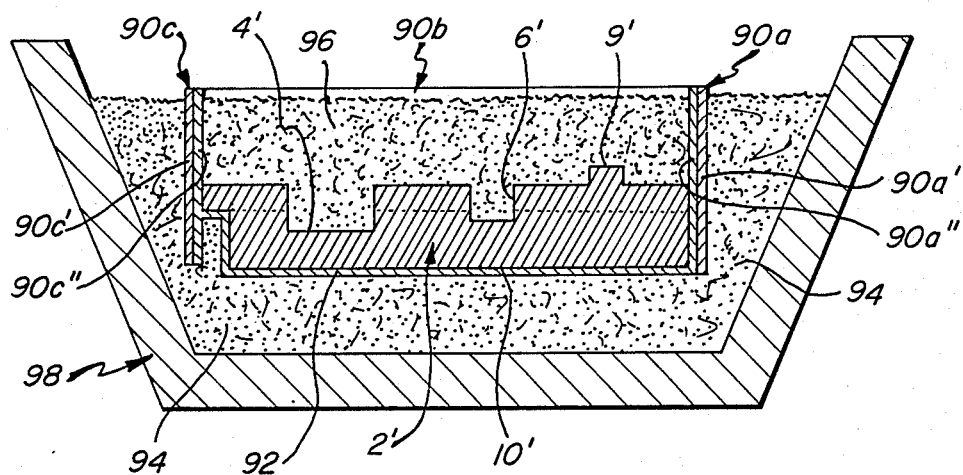
FIG. 11 is a schematic, cross-sectional view in elevation showing an assembly of the shaped parent metal precursor and barrier means of FIG. 10 emplaced within a refractory vessel in an assembly including a conformable filler and barrier means.

Referring now to FIGS. 10 and 11, there is shown another method of obtaining a ceramic composite body similar or identical to that illustrated in FIG. 3, which by use of suitable barrier means controls the extent of growth of the oxidation reaction provided and thus avoids the necessity of machining or grinding to the extent required to shape the irregular portions of the ceramic body of FIG. 4 (which was formed by utilizing the assembly of FIG. 2). As shown in FIG. 10, a parent metal precursor 2' is similar or identical in shape to the parent metal precursor 2 of FIGS. 1, 1A and 2. Thus, parent metal precursor 2' has a flat surface 10', an opposite surface 8' from which extends a rectangular land 9' and in which are formed a groove 4' and a cylindrically shaped bore or cavity 6'. A shoulder flange 11' extends along one side of parent metal precursor 2' which is encased within a rectangular barrier means 90 which comprises, in effect, a rectangular shaped heavy paper or thin cardboard box, open at its opposite ends. Rectangular barrier means 90 is lined with plaster of paris in a manner similar to that of rectangular barrier means 88 of the FIG. 9 embodiment. Thus, as illustrated in FIG. 10, rectangular barrier means 90 comprises walls 90a, 90b, 90c and 90d, most of wall 90d being broken away in FIG. 10 for improved clarity of illustration. Each of walls 90a–90d has an interior lining of hardened plaster of paris as best illustrated with respect to cross sectioned wall 90c which shows cardboard outer wall 90c' having an inner lining of plaster of paris 90c'' thereon. Similarly, as shown in FIG. 11, wall 90a is comprised of cardboard 90a' having thereon a plaster of paris layer 90a''. Surface 10' of parent metal precursor 2' has a coating 92 of plaster of paris applied thereto.

Five of the six major surfaces of parent metal precursor 2' are thus covered by a barrier means comprising, in the illustrated embodiment, a layer of plaster of paris. As with all the plaster of paris/cardboard barrier means illustrated, the cardboard or paper serves as a form on which the plaster of paris may be applied in its wet or plastic state, and then allowed to dry to harden into a rigid barrier means. The cardboard also serves to reinforce the plaster of paris barrier means to help prevent cracking or breakage during handling and assembling the barrier means and parent metal precursor into the refractory vessel. As indicated earlier, any other suitable materials may be substituted for the paper or cardboard, and for the plaster of paris.

With growth of the oxidation reaction product thus inhibited or precluded by the barrier means, surface 8', groove 4', bore 6' and land 9' together comprise the positive pattern of parent metal precursor 2', the remaining surfaces thereof comprising the non-replicating section of parent metal precursor 2'.

FIG. 11 shows parent metal precursor 2' and its associated barrier means 90 embedded within a bed of particulate inert material 94 and containing, in the "freeboard" space above precursor 2', a conformable filler 96. The upper portion (as viewed in FIGS. 10 and 11) of rectangular barrier means 90 extends above the surface 8' of parent metal precursor 2' and thus serves to separate the bed of conformable filler 96 from the bed of particles of inert material 94 contained within refractory vessel 98. By heating the assembly of FIG. 11 to a suitable elevated temperature and maintaining it at that temperature for a sufficient period of time in accordance with the methods described above, a ceramic composite body similar or identical to that illustrated in FIG. 3 is obtained, as will be shown by the example given below.

The ceramic composite structures obtained by the practice of the present invention will usually be a dense, coherent mass wherein between about 5% and about 98% by volume of the total volume of the composite structure is comprised of one or more of the filler components embedded within a polycrystalline ceramic matrix. The polycrystalline ceramic matrix is usually comprised of, when the parent metal is aluminum and air or oxygen is the oxidant, about 60% to about 99% by weight (of the weight of polycrystalline matrix) of interconnected alpha-alumina and about 1% to 40% by weight (same basis) of non-oxidized metallic constituents, such as from the parent metal.

The invention is further illustrated by the following non-limiting examples.

EXAMPLE 1

A parent metal precursor was machined to have the shape shown in FIGS. 1, 1A and 10. The precursor was machined from a block of aluminum alloy 380.1 obtained from Belmont Metals, Inc. and having a nominal composition of 8 to 8.5% by weight silicon, 2 to 3% by weight zinc, 0.1% by weight magnesium, 3.5% by weight copper as well as iron, manganese and nickel, although the magnesium content was sometimes higher as in the range of 0.17–0.18%. The resultsometi ant shaped parent metal precursor was provided with a barrier means as illustrated by barrier means 90, 92 in FIG. 10. The barrier means corresponding to 90 of FIG. 10 comprised a cardboard form on which plaster of paris (Bondex, obtained from Bondex Company) was applied in a layer approximately 1/16 to ⅛ inches thick. The barrier means corresponding to 92 in FIG. 10 comprised a layer of the same plaster of paris, approximately 1/16 to ⅛ inches thick. Thus, the surfaces corresponding to surfaces 10, 7a, 7b, 7c and 7d of the parent metal precursor illustrated in FIGS. 1, 1A and 10 were coated with a barrier material and comprised the non-replicating section of the precursor. Surface 8, groove 4, bore 6 and land 9 were free of the barrier material and so comprised the positive pattern of the parent metal precursor. The barrier means corresponding to 90 of FIG. 11 extended approximately ⅜ of an inch above the surface 8 of the parent metal precursor. A filler comprising a uniform admixture of alumina particles (38 Alundum obtained from Norton Company) comprising 70 weight percent 220 grit particles and 30 weight percent 500 grit particles, and silicon metal particles in the amount of 7% by weight of the total weight of Alundum particles, was placed within the freeboard space above the precursor provided by the barrier means corresponding to 90 of FIG. 10. The filler was thus placed in conforming engagement with the positive pattern provided by the surface 8, groove 4, bore 6 and land 9. The assembly of the barrier means, filler and parent metal precursor was placed upon and embedded within a bed of inert material comprising alumina particles (E1 Alundum obtained from Norton Company, of 90 mesh size) in the manner illustrated in FIG. 11. The bed of inert material corresponds to 94 of FIG. 11 and was substantially level with the top of the barrier enclosure means corresponding to 90 of FIG. 11.

The resulting assembly was placed into a furnace and heated in air at 1000° C. for 28 hours. The assembly was allowed to cool and the ceramic composite body grown from the parent metal precursor was removed from the refractory vessel and excess filler and barrier material was removed therefrom by light sandblasting. A ceramic body generally with the shape illustrated in FIG. 3 was obtained, which showed high fidelity inverse replication of the positive pattern of the parent metal precursor.

EXAMPLE 2

A block of the same aluminum alloy as utilized in Example 1 was machined and bored to provide a parent metal precursor having the shape illustrated in FIGS. 8 and 8A and overall dimensions of 2½ inches long by 1¼ inches wide by 11/16ths of an inch thick, with a cylindrical bore (corresponding to 78 of FIGS. 8 and 8A) being ¾ inch in diameter. A rectangular land (corresponding to 76 of FIGS. 8 and 8A) measured 1/16th inch thick (height above the surface corresponding to 74 of FIGS. 8 and 8A) and ¼ inch wide. A paper tube filled with plaster of paris (Bondex, from Bondex Company) was inserted into the bore with the outer diameter of the paper tube congruent to and in contact with the surface of the cylindrical bore and the cylindrical barrier means extending about ¼ inch out of each opposite end of the cylindrical bore. Plaster of paris (Bondex supplied by Bondex Company) was applied in a thick layer to a heavy paper material in a shape of a rectangular box open at its opposite ends, the dimensions of the box being about 3 inches long by 1½ inches wide and 1¼ inches high. This plaster of paris-coated box corresponds to barrier means 88 of FIG. 9.

A base layer of inert material comprising E1 Alundum, from Norton Company, of 90 mesh size was placed within a refractory crucible. One open end of the rectangular barrier means was placed upon the layer of inert material, and the parent metal precursor (with the cylindrical barrier means inserted in the bore thereof) was embedded within a bed of filler (corresponding to 84 of FIG. 9) contained within the rectangular barrier means, substantially as shown in FIG. 9. The filler was the same filler as used in Example 1 and substantially filled the rectangular barrier means. The same type of inert material (corresponding to 86 of FIG. 9) as used in Example 1 was added to approximately the same height as the filler and the result was an assembly substantially as illustrated in FIG. 9. The resulting setup was placed into a furnace and heated in an air atmosphere at 1000° C. for 28 hours. After this period, the assembly was allowed to cool and the resulting ceramic composite body obtained therefrom was removed from refractory vessel 80 and excess filler and barrier material adhering to it were removed by light sandblasting. The result was a ceramic body substantially as shown in FIG. 7 which faithfully inversely replicated the positive pattern portion of the parent metal precursor.

In both Examples 1 and 2 the conformable filler placed in contact with the positive pattern of the parent metal precursor is a self-bonding, conformable filler so that any pressure differential acting on the forming oxidation reaction product was resisted by the self-bonding nature of the filler. That is, if a pressure differential should occur across the forming shell of oxidation reaction product because migration of the molten parent metal to form additional oxidation reaction product leaves behind a cavity of reduced pressure, the self-bonding nature of the filler provides sufficient mechanical strength to resist the mechanical forces imposed on the shell of forming oxidation reaction product by the pressure differential. However, in the two Examples, the thin layer of plaster of paris forming the barrier means was sufficiently permeable to air so that air permeated therethrough and equalized the pressure in the cavity or void formed by the migrating parent metal.

Although only a few exemplary embodiments of the invention have been described in detail above, those skilled in the art will readily appreciate that the present invention embraces many combinations and variations other than those exemplified.

What is claimed is:

1. A method for producing a self-supporting ceramic composite body having a negative pattern inversely replicating a positive pattern of a parent metal body, said composite body comprising (1) a ceramic matrix obtained by oxidation of a parent metal to form a polycrystalline material comprising an oxidation reaction product of said parent metal with an oxidant; and (2) a filler embedded by said ceramic matrix, the method comprising the steps of:
   (a) providing a parent metal body having (1) a positive pattern section for inverse replication, and (2) a non-replicating section;
   (b) emplacing at least said positive pattern section of said parent metal body in conforming engagement with a bed of conformable filler and using a means for promoting growth of said oxidation reaction product from said positive pattern section into said filler material and a means for inhibiting oxidation reaction product growth from said non-replicating section, said conformable filler (i) being permeable to said oxidant when said oxidant contacts molten parent metal in step (c), and (ii) being permeable to infiltration by the growth of the oxidation reaction product through said conformable filler;
   (c) heating the parent metal body to a temperature region above its melting point but below the melting point of its oxidation reaction product to form a body of molten parent metal and, at said temperature,
      (1) reacting the molten parent metal with said oxidant to form said oxidation reaction product.
      (2) maintaining at least a portion of said oxidation reaction product in contact with and between said body of molten metal and said oxidant, to progressively draw molten metal from said body of molten metal through the oxidation reaction product and into contact with said oxidant within said bed of filler to concurrently form said negative pattern in said bed of filler as fresh oxidation reaction product Continues to form at the interface between said oxidant and previously formed oxidation reaction product,
      (3) and continuing said reacting for a time to at least partially embed said bed of conformable filler within said oxidation reaction product by growth of oxidation reaction product into said conformable filler to form said composite body with said negative pattern; and (d) separating the resulting self-supporting ceramic composite body from any excess filler and any unreacted parent metal.

2. The method of claim 1, wherein said means for inhibiting formation of oxidation reaction product comprises emplacing said parent metal body in engagement with said bed of comformable filler such that said non-replicating section of said parent metal body is free from contact with said bed of conformable filler.

3. The method of claim 1, wherein said means for inhibiting formation of oxidation reaction product comprises providing an overlaying means on at least a portion of said non-replicating section of said parent metal for inhibiting growth of said oxidation reaction product from said non-replicating section.

4. The method of claim 3, wherein said oxidant comprises a vapor-phase oxidant and said overlaying means for inhibiting formation of oxidation reaction product, under the reacting conditions of step (c), is permeable to said vapor-phase oxidant.

5. The method of claim 4, wherein said oxidant comprises a vapor-phase oxidant and said overlaying means for inhibiting formation of oxidation reaction product comprises a layer of plaster of paris.

6. The method of claim 1, wherein said means for inhibiting formation of oxidation reaction product comprises overlaying at least a portion of said non-replicating section with a layer of inert material.

7. The method of claim 1, wherein said means for inhibiting formation of oxidation reaction product comprises overlaying said non-replicating section with a means for inhibiting growth of said oxidation reaction product.

8. The method of claim 1, wherein said means for promoting formation of oxidation reaction product comprises applying an external dopant exclusively to said positive pattern section.

9. The method of claim 8, wherein said means for inhibiting formation of oxidation reaction product comprises emplacing said parent metal body in engagement with said bed of conformable filler so that said non-replicating section of said parent metal body is free from contact with said bed of filler.

10. The method of claim 8, wherein said means for inhibiting formation of oxidation reaction product comprises overlaying said non-replicating section with a means which inhibits growth of said oxidation reaction product.

11. The method of claim 1, wherein said bed of conformable filler is self-bonding to resist a pressure-differential formed across said oxidation reaction product by growth thereof.

12. The method of any one of claims 1, 2, 3, 6, 7, 8, 9, 10 or 11, wherein said oxidant comprises a vapor-phase oxidant.

13. The method of claim 12, wherein said parent metal comprises an aluminum parent metal.

14. The method of claim 1, wherein said means for promoting formation of oxidation reaction product comprises at least one of a solid oxidant and a liquid oxidant in a portion of said bed of conformable filler liquid oxidant in a portion of said bed of conformable filler adjacent to said positive pattern section.

15. The method of any of claims 1, 2, 3, 4, 5, 6, 7, 8, 9, 10, 11 or 14, wherein said parent metal body comprises an aluminum parent metal.

16. The method of claim 12, wherein said oxidant comprises an oxygen-containing gas.

17. The method of claim 12, wherein said oxidant comprises a nitrogen-containing gas.

18. The method of claim 12, wherein said oxidant is air.

19. The method of claim 12, wherein said oxidant comprises forming gas.

20. The method of any one of claims 1, 2, 3, 4, 5, 6, 7, 8, 9, 10 or 11, wherein said parent metal body comprises a metal selected from the group consisting of aluminum, silicon, titanium, tin, zirconium and hafnium parent metals and mixtures thereof.

21. The method of any one of claims 1, 2, 3, 4, 5, 6, 7, 8, 9, 10 or 11, wherein said oxidant comprises a material selected from the group consisting of at least one of an oxygen-containing gas, a nitrogen-containing gas, a halogen, sulfur, phosphorus, arsenic, carbon, boron, selenium, tellurium, silica, methane, ethane. propane, acetylene, ethylene, propylene, and mixtures thereof.

22. The method of any of claims I, 2, 3, 4, 5, 6, 7, 8 or 9, wherein said conformable filler comprises a material selected from the group consisting of hollow bodies, particulates, fibers, whiskers, spheres, steelwool, plates aggregate, wires, rods, bars, platelets, pellets, tubes, refractory fiber cloth, tubules, and mixtures thereof.

23. The method of any one of claims 1, 2, 3, 4, 5, 6, 7, 8, 9, 10 or 11, wherein said filler comprises a material selected from the group consisting of at least one of aluminum oxide, silica, silicon carbide, silicon aluminum oxynitride, zirconium oxide, barium titanate, boron nitride, silicon nitride, magnesium aluminate, ferrous alloys, iron-chromium-aluminum alloy, carbon, aluminum, and mixtures thereof.

24. A method for producing a self-supporting ceramic composite body having a negative pattern inversely replicating a positive pattern of a parent metal body, said composite body comprising (1) a ceramic matrix obtained by oxidation of an aluminum parent metal to form a polycrystalline material comprising an aluminum oxidation reaction product of said parent metal with air; and (2) a filler embedded by said ceramic matrix, the method of comprising the steps of:

(a) providing an aluminum parent metal body having (1) a positive pattern section for inverse replication, and (2) a non-replicating section;

(b) emplacing at least said positive pattern section of said parent metal precursor in conforming engagement with a bed of conformable filler and using a means for promoting growth of said oxidation reaction product primarily from said positive pattern section into said filler material and a means for inhibiting oxidation reaction product growth from said non-replicating section, said conformable filler (i) being permeable to air to enable contact of the molten parent metal by air in step (c), and (ii) being permeable to infiltration by the growth of the oxidation reaction product through said conformable filler;

(c) heating the emplaced positive pattern to a temperature region of from about 850° C. to about 1450° C. to form a body of molten aluminum parent metal and, at said temperature, (1) reacting the molten parent metal with said air to form said alumina oxidation reaction product, (2) maintaining at least a portion of said alumina oxidation reaction product in contact with and between said body of molten metal and said air, to progressively draw molten metal from said body of molten metal through the alumina oxidation reaction product and into said bed of filler to concurrently from said negative pattern in said bed of conformable filler as fresh alumina oxidation reaction product continues to form at an interface between said air and previously formed alumina oxidation reaction product, and (3) continuing said reacting for a time to at least partially embed said bed of conformable filler within said alumina oxidation reaction product by growth of oxidation reaction product into said conformable filler to form said composite body with said composite body with said negative pattern; and (d) separating the resulting self-supporting ceramic composite body from any excess filler and any unreacted parent metal.

25. The method of any one of claims 1, 2, 3, 4, 5, 6, 7, 8, 9, 10, 11 or 24, including doping said parent metal with at least one dopant material by at least one of (a) alloying at least one dopant into said parent metal, and (b) applying at least one dopant as a layer of dopant material onto at least a portion of a surface of said positive pattern of said parent metal body, and (c) providing at least one dopant at least partially within said conformable filler adjacent to said positive pattern.

26. The method of claim 25, wherein said dopant material comprises as a source at least one material selected from the group consisting of magnesium, zinc, silicon, germanium, tin, lead, boron, sodium, lithium, calcium, phosphorus, yttrium, lanthanum, cerium, praseodymium, neodymium and samarium.

27. The method of claim 25, wherein said polycrystalline material further includes an initialation surface of a spinel formed as an oxidation reaction product of said parent metal, said dopant and said oxidant.

* * * * *